Sept. 23, 1947.    W. E. F. LAGING    2,427,678
AUXILIARY ELECTRICAL GENERATING AND CONTROL SYSTEM
Filed Aug. 25, 1945    5 Sheets-Sheet 1

INVENTOR.
WERNER E.F. LAGING
BY
ATTORNEYS

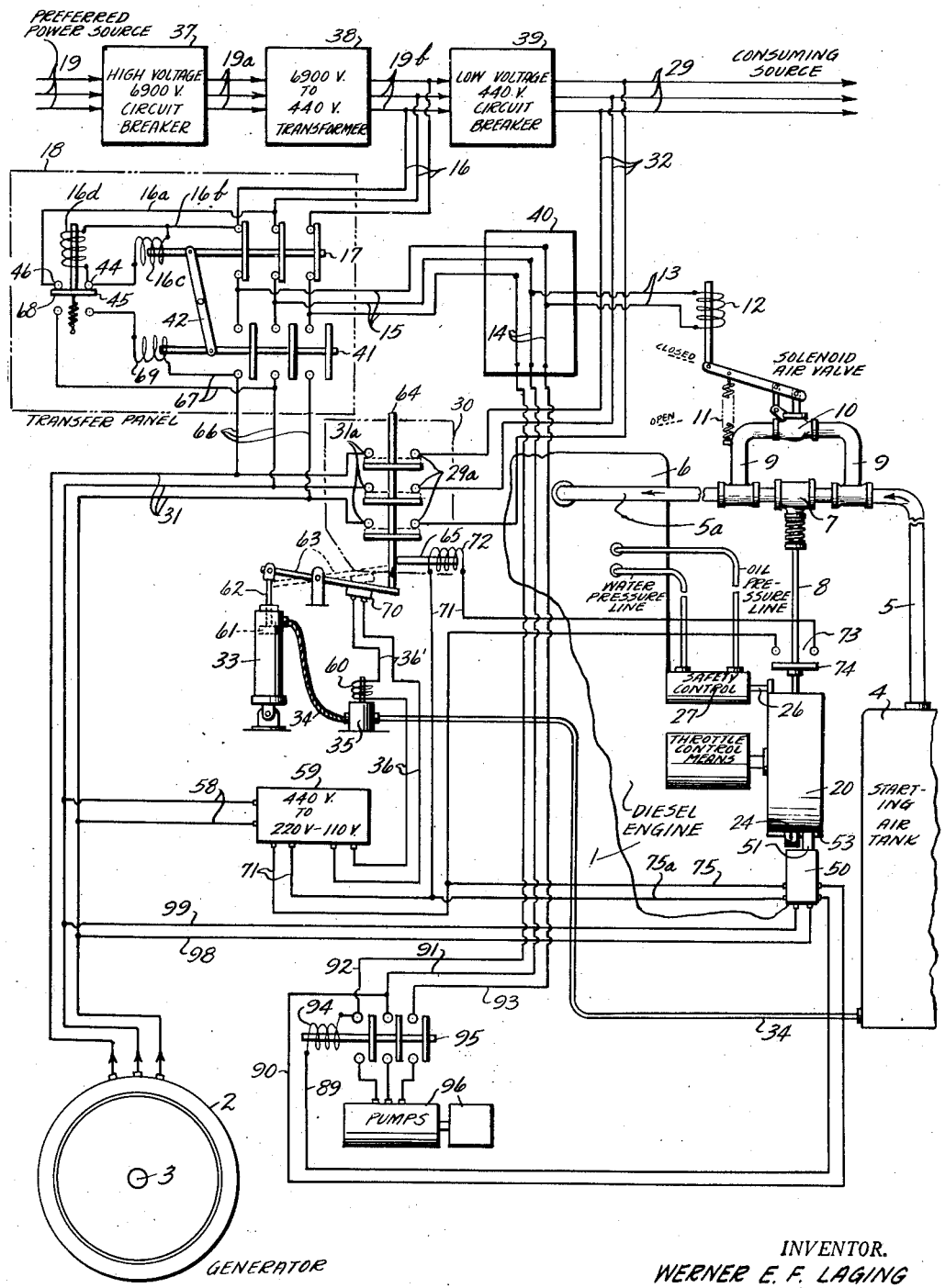

Sept. 23, 1947. W. E. F. LAGING 2,427,678
AUXILIARY ELECTRICAL GENERATING AND CONTROL SYSTEM
Filed Aug. 25, 1945 5 Sheets-Sheet 3
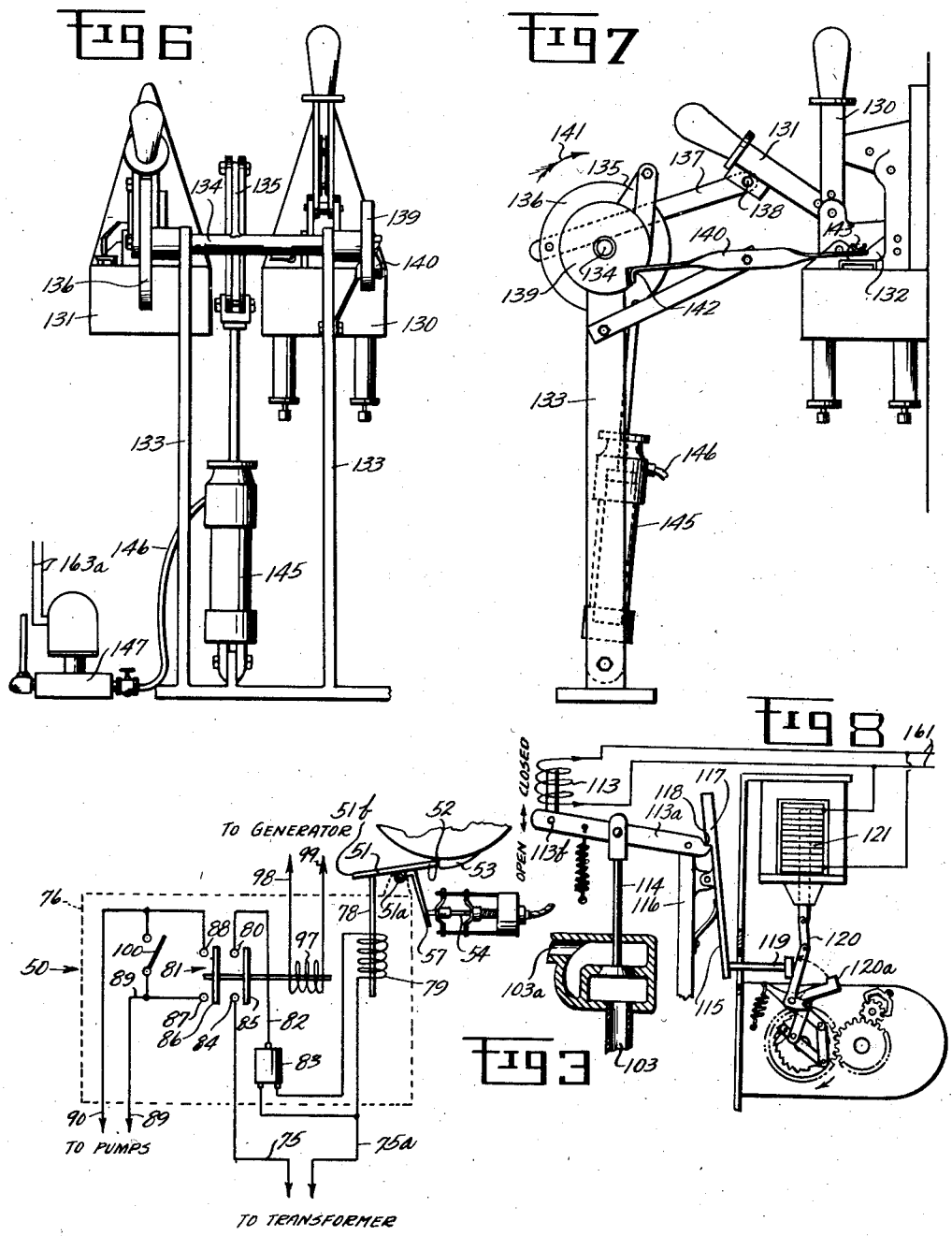
INVENTOR.
WERNER E. F. LAGING

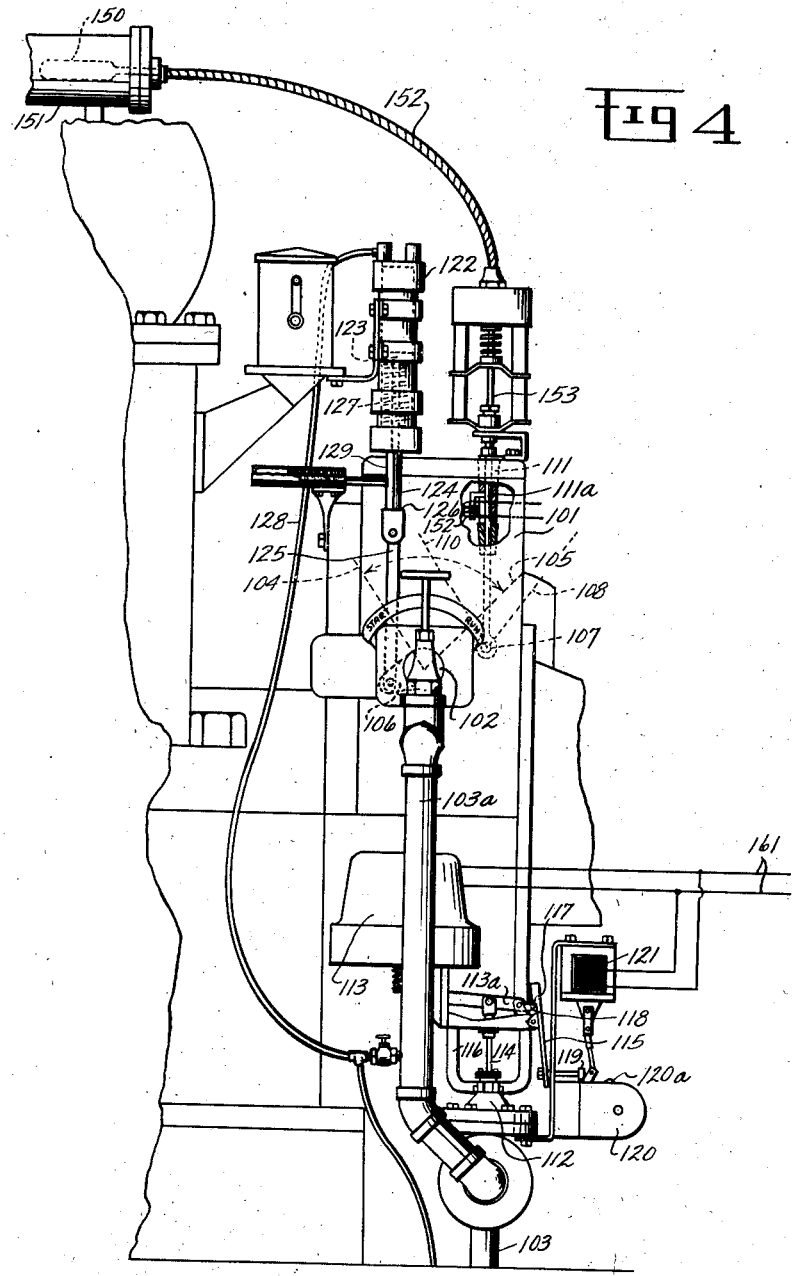

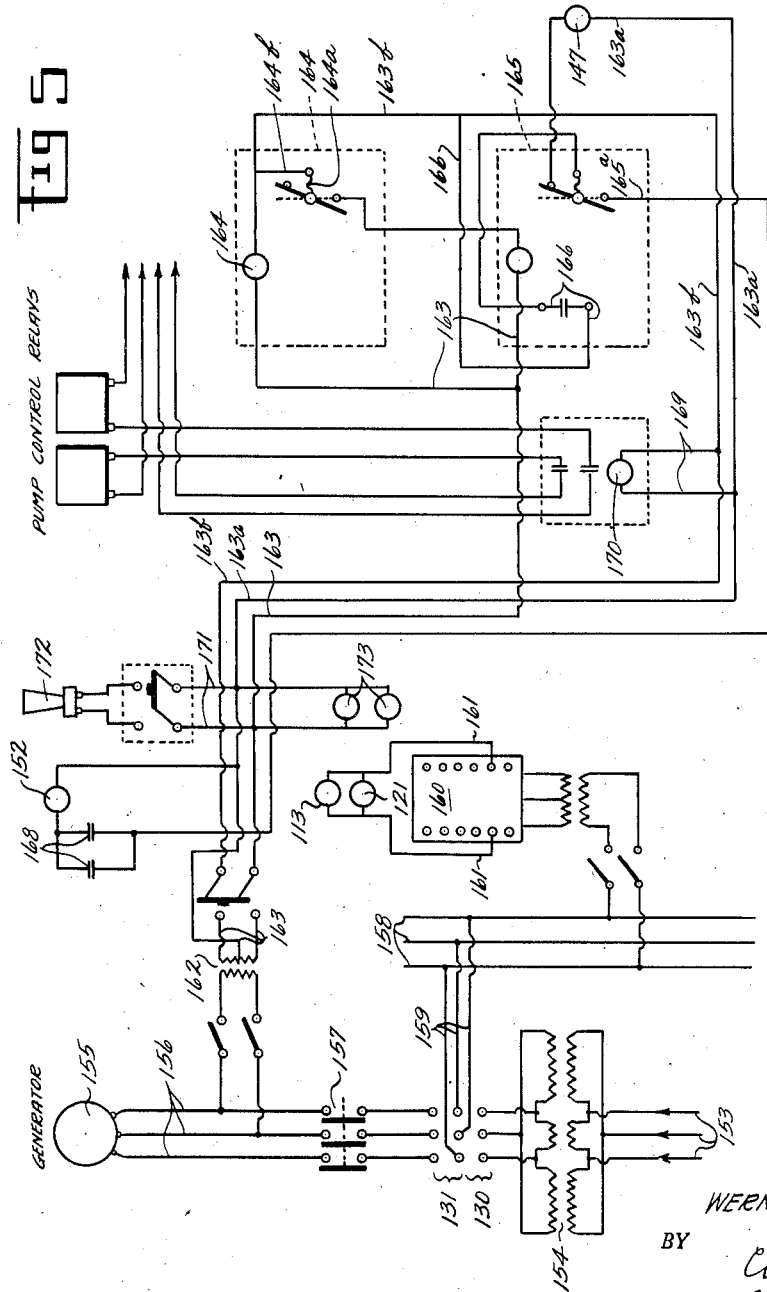

Patented Sept. 23, 1947

2,427,678

UNITED STATES PATENT OFFICE 2,427,678

AUXILIARY ELECTRICAL GENERATING AND CONTROL SYSTEM

Werner E. F. Laging, Dayton, Ohio

Application August 25, 1945, Serial No. 612,701

18 Claims. (Cl. 290—30)

(Granted under the act of March 3, 1883, as amended April 30, 1928; 370 O. G. 757)

The invention described herein may be manufactured and used by or for the Government for governmental purposes without payment to me of any royalty thereon.

This invention relates to power generating plants for supplying electrical power to an electrical consuming source or circuit automatically, as an alternate supply source, in the event of failure of the electrical power normally supplied to the electrical consuming source from a preferred electrical source.

There are certain electricity consuming sources, such as lights for airplane landing fields, certain electrical devices for steam generating and heating plants, lighthouse beacons, theatres, and the like, which are normally supplied with electricity from outside or preferred electricity generating sources, such as the power plants of nearby cities, towns and municipalities. Since electrical power from these preferred sources is often interrupted, due to many well-known causes, it is imperative that these airplane landing field lights and the other mentioned electrical current consuming sources be provided with some means for immediately supplying an auxiliary electrical power during interruption of the electrical power from the preferred source. These auxiliary power plants usually include a steam or internal combustion engine-driven electrical generator, and means for disconnecting the preferred electrical source from the consuming source and then connecting the consuming source to the substitute or alternate electrical power generated by the engine-driven generators.

Diesel engines are commonly used in these auxiliary power plants for driving the generators to supply the alternate electrical power to the consuming source. These engines are often large and powerful, and are started by movement of a conventional throttle wheel or similar shiftable control means to a starting position which opens a starting air valve to admit starting air to the cylinders of the engine to "crank" the engine up to starting speed. Valve means on the engine controls the starting air under pressure to the cylinders at the proper time to drive the pistons in the engine cylinders downwardly in the desired order to bring the engine up to starting speed. The throttle control means, or throttle wheel, is then moved to "running" position to interrupt the flow of starting air supplied from an air pressure storage reservoir, after the engine is running under its own power. Provision is also made in these conventional constructions for locking the throttle wheel control means in this "running" position during the proper and normal operation of the engine, by movement of a locking means to locking position, to lock the throttle wheel in "running" position by predetermined pressure of the lubricating oil supplied to the engine by pumps, driven by the engine or independently thereof for the lubrication of the engine.

From the above it will be noted that upon failure of the preferred electrical power source, the throttle control wheel means of some of these Diesel electrical generating plants must first be manually turned to "starting" position to open the starting air valve to crank the engine, then when the engine is turning over sufficiently fast to fire the fuel when introduced therein, the throttle valve must be manually turned to "running" position to control the introduction of the fuel into the cylinders in the proper order, and desired quantity. This requires a constant attendant for the engine to operate the throttle control means in order to start the engine when an emergency condition arises, so that there will be no prolonged interruption in the change-over from the preferred electrical source that has failed to the auxiliary electrical source. The attendant must also operate certain conventional switches and circuit breakers, associated with the two electrical power supply sources in order to disconnect the preferred electrical source from the consuming electrical source and connect the engine-driven generator in circuit with the consuming source.

An object of this invention is the provision of means for automatically starting a Diesel engine having conventional manually controlled starting air control apparatus, upon the failure of the preferred source.

Another object of the invention is the provision of secondary holding means for holding the throttle wheel control means of a conventional Diesel engine driven auxiliary electrical power generating plant in "running" position, in which the holding means is releasable by current that is generated by the auxiliary electrical power generating plant after a predetermined time delay period which is sufficient for the starting of the engine and the proper function thereof, so as to permit the conventional oil pressure operated safety lock means for holding the throttle wheel in "running" position to become effective to subsequently hold the wheel control means in "running" position.

A further object of the invention includes means for automatically disconnecting the preferred electrical power source from the electrical consuming source and subsequently automatically connecting the auxiliary electrical generating source, driven by the Diesel, with the electrical consuming source after a pretetermined time delay period has elapsed which is sufficient for the automatic starting of the Diesel and continued normal operation thereof, and sufficient for the generation of a predetermined auxiliary electrical output thereby.

A further object is the provision of means for automatically rendering the secondary throttle wheel control holding means inoperative after the engine has started and a predetermined time delay period has elapsed, also including thermally operable means, operable incident to a predetermined degree of heating of the cooling water which is circulated through the engine to release said time delay mechanism locking means in the event the time delay operation means fails.

A still further object is the provision of latching means to prevent the operation of the Diesel starting means, and electro-magnetic time delay release means for said latch means including an energizing circuit for setting the time delay release means and holding the same in set position while the preferred circuit is energized.

Other objects and advantages of the invention will become apparent from the following description, taken in connection with the accompanying drawings in which like reference characters refer to like parts in the several figures.

Fig. 2 is a somewhat schematic wiring diagram, illustrating my invention and a wiring arrangement for effecting the automatic transfer from the preferred electrical power source to the auxiliary electrical power source in the event of a failure of the preferred electrical source.

Fig. 3 is an enlarged diagrammatic view of the supplemental throttle wheel control latch device.

Fig. 4 is a fragmentary elevation of a slightly different automatic control installation, including a predetermined time delay device for preventing operation of the starting air valve control solenoid for a time delay period to delay the immediate starting of the engine, in the event that the interruption of the preferred electrical power source is short and not longer than the time delay period.

Fig. 5 is a wiring diagram of the circuits employed in the modified form, as shown in Fig. 4.

Figs. 6 and 7 are front and side views respectively of the circuit breakers and actuating means employed in the modified form of my invention.

Fig. 8 is a fragmentary detail view of the time delay latch release mechanism employed in the modified form to delay the starting of the Diesel engine for a time period after failure of the preferred source.

Figure 1:
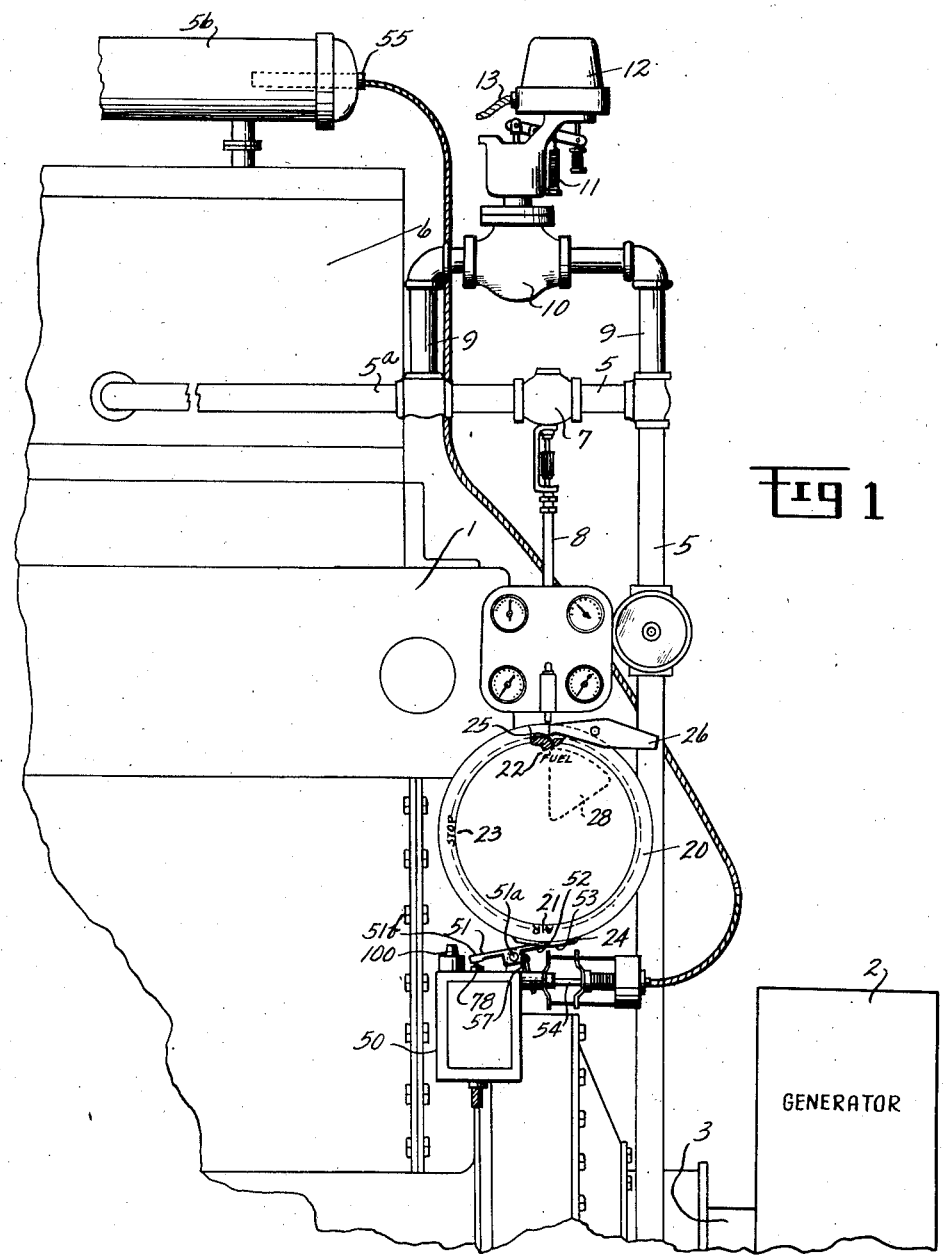
Fig. 1 is a fragmentary side elevation of a portion of a conventional Diesel engine driven auxiliary electrical power generating plant, illustrating my invention applied thereto in heavy lines, while the conventional engine structure is shown primarily in light lines.

Referring more particularly to Figs. 1 and 2, the numeral 1 indicates a conventional internal combustion engine of the full Diesel type, such as a Worthington Series E–E type, and the numeral 2 indicates a conventional dynamo or electrical current generator, connected to the Diesel engine in conventional driving relation, directly to the crank shaft 3 of the Diesel.

Starting air for "cranking" the engine is supplied from any suitable pressure source such as a pressure reservoir 4 which is maintained at a predetermined working pressure by conventional compressors or pump means driven either directly by the Diesel, or preferably electrically by current furnished by the electrical consuming source. A supply pipe 5 leading from the air pressure source 4 to the cylinders 6 of the engine is provided having a spring-closed valve 7 interposed therein with a downwardly extending valve actuating rod 8. Upward movement of the rod 8 opens the valve 7 to admit starting air to the engine to crank the same. I provide a by-pass conduit 9 which is connected to the aforesaid starting air supply conduit 5 at opposite sides of the valve 7, and a conventional solenoid closed starting air valve 10 is interposed in this by-pass conduit 9, between the connections thereof to the main starting air supply conduit 5. This valve 10 is provided with spring means 11 for moving the valve to open position, and a solenoid actuator 12 is electrically connected to the preferred electrical source, through the conductors 13, 14, 15, and 16, and circuit closure or breaker 17 of the transfer panel 18.

Failure of the preferred electrical source 19 deenergizes the solenoid 12, permitting the spring 11 to open the starting air valve 10 to by-pass the starting air around the main conventional air control valve 7 into the air conduit 5a leading to the cylinders 6 of the Diesel engine. Means for re-energizing this by-pass valve 10 to close the same after the engine has been started and electricity is being generated is provided so that the starting air will not be wasted and the air starting air supply can be replenished will be described later in detail.

Located on the engine, directly below the vertical push rod 8 for opening the main air valve 7 is a throttle control means in the form of a rotatable circular-shaped throttle wheel 20 having its axis disposed directly under the push rod 8 with the lower end of the rod 8 in juxtaposed relation to the periphery of the throttle wheel. This throttle wheel 20 is a conventional form of throttle control means for the Diesel engine and has two extreme positions and an intermediate position with respect to the lower end of the push rod 8. These positions are the "starting" and "running" positions as indicated at 21 and 22 in the drawings, and the intermediate or "stop" position 23. A cam member 24 is fixed on the periphery of the wheel 20, for camming engagement with the lower end of the main starting air valve push rod 8 when the throttle wheel 20 is rotated to the "starting" position 21 and a notch 25 is formed in the periphery of the throttle wheel 20 for engagement with the locking or holding lever 26 of the engine when the throttle wheel is rotated to "running" position 22. The locking lever 26 and notch 25 in the wheel are also conventional features of the engine. The locking lever 26 is suitably pivoted to the engine structure adjacent the throttle wheel 20 and is provided with moving means for normally rotating the lever to swing the notch engaging end thereof away from the notch 25 in the throttle wheel 20. Safety control means are conventionally provided for rocking this lever 26 into engagement with the notch 25 when the throttle wheel is in its "running" position 22, upon proper functioning only of the engine, such as the pressure operated means 27, operated by the pressure of the oil supplied to the engine for its lubrication purposes. In the event of failure of oil pressure, the lever 26 is rocked to disengaging position, freeing the throttle wheel means 20. The throttle wheel is conventionally provided with means for returning the same when released to "stop" position 23, such as a return spring or a counterweight 28, as shown in Fig. 1 in the drawings.

Referring to Figs. 1 and 2, means are provided for automatically disconnecting the auxiliary source circuit 31 from the consuming source 29, such as a circuit disconnect breaker 30 arranged between the auxiliary electrical source 31 and the consuming source 29. When the throttle wheel 20 is in "starting" position, upward movement of the plunger 8, actuated by the cam 21 on the throttle wheel 20, as it is rotated to starting position, closes a circuit to operate the disconnect breaker 30 for the purpose just described. This arrangement is conventional, and therefore not described in detail.

Referring again to the diagrammatic showing in Fig. 2, the main electrical consuming source or circuit includes power lines 29 while the auxiliary electrical source power lines or circuit from the Diesel engine-driven generator 2 are indicated at 31 and may be connected as shown in the drawing for purposes of illustration.

The auxiliary source breaker 30 controls the electrical output between the generator 2 and the conductors 32 leading to the consuming source 29. Electro-magnetic controlled means for closing this auxiliary source breaker 30 is provided in the form of an air operated piston actuator 33 having an air supply conduit 34 connected to a suitable air pressure source such as the air pressure reservoir 4 containing the starting air under pressure for the Diesel engine. A solenoid actuated air admission valve 35 is interposed in the air line 34 between the air operated piston actuator 35 and the air tank 4 having an energizing circuit 36 connected to the auxiliary output conductors 31 leading from the generator 2 through a step down transformer 59.

From the preceding description it will be noted that the auxiliary electrical supply source 31 will be disconnected from the electrical consuming source 29, 32 when the throttle wheel 20 is rotated to "starting" position, regardless of whether the preferred electrical source de-energizes and trips the conventional circuit breaker 37, 39 in the preferred electrical source circuit or not, breaking the auxiliary circuit 31, 32 to the consuming source conductors 29 in any event, so that it is not possible to energize the consuming source from the auxiliary source and at the same time energize the consuming source from the preferred source in the event that the preferred source again becomes energized after a failure while current is being supplied to the consuming circuit by the auxiliary source.

With the control switches or breakers 18 and 30 in the position shown in full lines in Fig. 2, electrical energy from the preferred source 19 passes through the high voltage circuit breaker 37, through the transformer 38 and low voltage circuit breaker 39, and through the electrical circuit conductors 29 of the consuming source.

The holding and closing solenoid for the starting air valve 10 is energized by electrical energy from the preferred circuit conductors 19, 19a, 19b, and 16, circuit breaker 17 of the station transfer panel 18, and through the conductors 15 to the conductors or busbars of the station power panel 40 constituting an auxiliary electrical power consuming source. The station power panel or auxiliary electrical consuming source 40 supplies current through the conductors 13 to the holding and closing solenoid coil 12, which holds the air valve 10 in closed position. Electrical energy is also supplied from the auxiliary consuming source or station power panel 40 in a conventional manner to operate the water and oil pumps, air compressors and other cooperating equipment necessary to proper and continued operation of the Diesel engine 1.

When the preferred electrical source 19 is energizing the main consuming source 29 and the auxiliary consuming source or station power panel 40, the auxiliary circuit breaker 30, controlling the auxiliary electrical power output over the conductors 31 is open, so that no current can flow from the preferred source 19 through the conductors 32 past the breaker 30.

The transfer circuit breaker 41 of the station transfer panel 18 is also open when the preferred electrical source 19, 19a, 19b is being used to prevent the electrical current from the conductors 16 from reaching conductors 31 which lead to the auxiliary power source generator 2. Briefly describing the station transfer panel 18, the two circuit breakers 17 and 41 are connected together for alternate circuit closing movements by a centrally pivoted lever 42. Two phases of the preferred source conductors 16 are connected to conductors 16a and 16b the conductor 16b leading to two solenoid coils 16c and 16d, with an intermediate lead 44 extending between the coils 16a and 16b and connected to one pole of a solenoid operated relay device 45. The conductor 16a leads to a contact 46 of the relay 45. When the armature of the relay bridges the contacts 44 and 46, closing the circuits between the preferred source and the solenoid coils 16c and 16d, the relay 45 is energized to maintain the circuits to the relay 45 and breaker closing coil 16c energized. The breaker solenoid or closing coil 16c maintains the circuit breaker 17 closed and the circuit breaker 41 in open position. In this position, the auxiliary consuming source or station power panel 40 is energized by the preferred source through the leads 16.

The auxiliary source circuit breaker 30 is set in circuit breaking position, as shown in full lines in Fig. 2, interrupting the circuit between the generator 2 and the preferred and consuming sources. In the event of failure of the preferred circuit or source 19, the circuit breakers 37 and 39 both trip, breaking the circuit at both sides of the conductors 16 leading to the station transfer panel consuming source 18, and also interrupting the circuit between the preferred source 19 and the consuming source 29. The circuit between the preferred source, although now "dead," and the station power panel 40 is broken through the transfer breakers 18. Since the station power panel 40 is disconnected from the preferred source and therefore de-energized, the circuit to the solenoid coil 12, holding the starting air control valve 10 closed, is de-energized, permitting the spring 11 to open this valve 10 to admit starting air to the cylinders 6 of the Diesel engine in the usual manner.

The throttle wheel 20 in my improved construction is initially set and held in "running" position 22 by a time delay control device 50 having a latch member 51 of somewhat bellcrank formation with an engaging end 52 disposed in locking or holding engagement with a lug 53, fixed on the periphery of the throttle wheel 20 adjacent the cam member 24 so as to hold the throttle wheel 20 in "running" position when the latch member 51 is engaged with the lug 53. The time delay control device 50 will be later described in more detail, but it should be noted that after a predetermined time delay period has elapsed, sufficient for the Diesel engine to start, and functioning properly under its own power, generating electricity, the time delay latch 51 is moved to released position by the time delay control device, freeing the throttle wheel 20, which is now held in "running" position by its conventional latch means 26 located on the engine and operated by the said conventional safety device of the engine. In the event that the engine fails to function properly, the throttle wheel 20 will be released by the conventional latch means or lever 26, permitting the throttle wheel to gravitate to "stop" position, stopping the engine.

By this time, however, if the conventional safety features of the engine are functioning properly, such as the circulation pressure of the cooling water, oil pressure for lubrication of the engine, etc., are up to their normal pressures, the safety release lever 26 will be rocked thereby to dispose the holding end thereof in the notch 25 in the throttle wheel preventing its return to "stop" position. Normal pressures from the oil and water conduits 21a and 27b function through the conventional actuator 27 to rock the safety lever 26 into holding engagement with the notch 25 in the throttle wheel rim.

Another safety feature is provided in my improvement electrical system in case the latch 51 fails to release by reason of the failure in the operation of the time delay device 50. A pressure operated plunger 54 is connected to a thermal bulb 55 located in the water circulating system of the engine, as indicated at 56, with the end of the plunger 54 disposed for actuating engagement with the arm 57 of the time delay latch bellcrank 51. If the temperature of the water reaches a predetermined degree, before the latch 51 is actuated by the time delay device 50, or should the time delay device fail to release the throttle wheel 20 after the water heats up, the expanding pressure column from the thermal bulb 55 will force the plunger 54 outwardly, rocking the latch 51 clockwise to disengaged position. By this time, if the engine is functioning properly, the engaging end of the safety lever 26 will be disposed in the notch 25 in the throttle wheel 20, maintaining the throttle wheel in its "running" position.

When the generator 2 is being rotated sufficiently to generate a predetermined degree of electricity, current is then supplied from the auxiliary source passes 31 through conductors 58 to the transformer 59, energizing the two leads 36 previously referred to and connected to the solenoid coil 60 for opening air valve 35 to admit air from the starting air reservoir 4 through the conduit 34 into the circuit breaker closing air cylinder device 33, driving the piston 61 of this auxiliary source circuit closer downwardly, as shown in dotted lines.

The piston rod 62 is connected to the piston 61 and rocks the lever 63 to close the circuit breaker contact member 64 to establish electrical contact between the contact terminals 31a from the auxiliary electrical source and the contact terminals 29a leading to the consuming electrical source 29, just behind the low voltage circuit breaker 39, thus connecting the auxiliary electrical power source 31, 32 with the consuming electrical source 29.

The solenoid operated trip latch 65 releases the auxiliary source circuit breaker 30 when actuated and also locks the breaker in closed position.

The electrical current from the conductors 31 also energizes the conductors 66 leading to the station transfer panel 18 and energizes the two conductors 67 connected to two of the conductors 66. Since the relay 45 is gravity operated and drops open when the preferred source fails, the other contact member 68 of the relay 45 bridges the ends of the conductors 67, and the solenoid breaker closing coil 69 for the breaker 41 is now energized to close the circuit breaker 41 and open the breaker 17 to interrupt the circuit from the preferred source 19 to the station power panel 40 which circuit is now "dead" and to energize the power panel from the auxiliary power source 2.

Re-energizing this station power panel 40 from the auxiliary power source 2 now occurs through the conductors 15 and the solenoid closing and holding coil 12 for the starting air valve 10, being again energized, moves the valve to closed position to interrupt the flow of the starting air to the Diesel engine.

A mercury switch 70 is carried on the lever 63 and is tilted to circuit breaking position as the lever 63 closes the circuit breaker 30. When the outer portion of the lever 63 is moved to its downwardly and outwardly inclined position, as shown in the drawings in dotted line position, the circuit 36 to the solenoid operated air valve 35 is broken, since one of the conductors 36 includes the mercury switch 70. In the initial or "set" position shown in full lines, the actuating lever 63 for the auxiliary source circuit breaker 30 is inclined outwardly and upwardly from its pivot and the two terminals in the mercury switch 20, connecting the leads 36' are closed so that the energizing coil 60 for the air valve 35 will be energized by energy received from the auxiliary electrical power source when the same is energized.

The transformer 59, energized by the generator 2, has a second set of conductors 71 leading therefrom to a solenoid trip coil 72 for the trip latch 65 of the circuit breaker 30. Intermediate one of these leads is a circuit leading to a switch having contacts 73 designed to be closed by a contact plate 74, or similar circuit closing means carried on the vertical push rod 8 for actuating the main starting air valve 7. In the event that the throttle wheel 20 is released by the release action of the lever 26, the counterweight 28 will rotate the throttle wheel 20 temporarily to its "starting" position, causing the cam 24 on the throttle wheel to raise the push rod 8 and close the circuit from the auxiliary source transformer 59, output leads 71 to the trip coil 72 energizing the trip coil 72, which causes the latch 65 to be withdrawn from its locking engagement with the breaker 30. The circuit breaker 30 functions to open the circuit between the consuming and auxiliary power supply lines 29, 32, and 31.

Connected to the conductors 71 intermediate the transformer 59 and the switch contacts 73 are a pair of conductors 75 and 75a which furnish electricity to my time delay operated release mechanism 50.

The time delay controlled mechanism 50 comprises a casing 76, rigidly mounted on the frame of the engine directly below the throttle wheel 20 and to the left thereof, as best seen in Fig. 2, the electrical conductors 75 and 75a leading into the lower side of the casing 76. The bellcrank shaped latch member 51 is freely tiltable about a pivot 51a fixed with respect to the engine frame, such as on a bracket extending from the top of the casing 76. A solenoid operated release plunger 78 is disposed within the casing 76, under the free end of the arm 51b of the bellcrank 51. The other end of the arm 51b extends beyond the pivot 51a, terminating in a latch or abutment member 52 designed to engage the lug 53 on the periphery of the throttle wheel when the same is in "running" position. A solenoid coil 79 is provided, connected at one end to the lead 75a while the other end of the coil 79 is connected to a contact 80 of a relay 81 by a conductor 82 having a fifteen-second time delay circuit closing device 83 interposed therein. The conductor 75 connects the other contact 84 of the relay. The relay 81 has a movable circuit closing contact member 85 for bridging the contact terminals 80 and 84, and is also provided with a second movable contact blade 86 for closing a pair of contacts 87 and 88 having conductors 89 and 90 leading to two phases 91 and 92 of the three-phase lines 91, 92, and 93, which are connected to the phase lines or busbars 14 of the station power panel 40. The conductor 89 has a solenoid coil 94 interposed therein for closing a circuit breaker 95 to supply current from the station power panel 40 to the engine pumps and other equipment such as those for supplying fuel, lubrication, engine water circulation means, and for operating the air compressors to replenish the starting air in the reservoir 4. These pumps are indicated generally at 96 in the drawings.

The relay 81 is provided with a closing coil 97 having energizing conductors 98 and 99 which are connected to two of the three generator phases 31.

A manually operable switch 100 is shunted across the two conductors 89 and 90 for energizing the pumps 96, so that the pump circuit may be closed manually whether the engine is in operation or not to supply current from the station power panel 40 for operation of the pumps 96, whether the station power panel 40 is energized by the preferred source 19, or by the auxiliary source generator 2 when the Diesel engine is in operation.

As before set forth, my improvements are primarily disclosed in the drawings in heavy lines, while the conventional structure is disclosed primarily in light lines. Improvements comprise the time delay means 50 for holding the throttle while control means 20 is in "running" position, the employment of the solenoid controlled starting valve 10, in conjunction with the automatic transfer panel circuit breakers 17 and 14 and the electrically controlled air operated valve means for closing the circuit breaker between the auxiliary electrical power source and the consuming source and disengaging the breaker air closing valve thereafter.

In describing the operation briefly, when the preferred source 19 fails, the two breakers 37 and 39 function to disconnect the preferred source from the consuming source. Lack of electrical energy in the preferred source de-energizes the starting air valve solenoid 12, permitting the starting air to by-pass around the main starting air valve 7 and into the cylinders of the engine, cranking the same in the conventional manner while the throttle valve 20 is held in "running" position by the time delay operated device 51.

After several revolutions, the engine will fire and then accelerate up to its normal speed in the well-known conventional manner. When the preferred electrical source 19 was interrupted, the relay 45 on the station transfer panel 18 opened by gravity to break the circuit to the holding coil 16c and establish a circuit closing connection through the conductors 67 to solenoid closing coil 69, so that the electrical energy now being generated by the dynamo 2, and energizing the phase lines 31, energizes the coil 69, closing the breaker 41 of the transfer panel as the simultaneous opening of the breaker 17 occurs. This disconnects the station power panel 18 from the preferred source 19 and connects the panel with the auxiliary electrical power lines 31, energy in which is now increasing as a Diesel and its generator accelerate up to their normal speeds. Current is also being supplied through the transformer 59 to the solenoid 60 which opens the air valve 31 when energized to admit a portion of the starting air to the breaker closing air cylinder device 33 to close the auxiliary electrical source circuit breaker 64, connecting the auxiliary electrical source with the consuming source. Mercury switch 70 in this circuit, and on the actuating lever 63 tilts as the actuating lever closes the breaker 30, breaking the circuit to the air valve solenoid 60, permitting the air valve 35 to close again. The closing of the breaker 41 of the station power panel 18 connects the station power panel, which is a secondary electrical consuming source, with the auxiliary electrical source 31. The energizing of the secondary consuming source or power panel 40 again energizes the solenoid 12 for closing the starting air valve 10, closing this valve to prevent further discharge of the starting air into the engine cylinders since the engine should by this time be operating under its own power.

Electrical energy from the generator 2 through the conductors 31, 98, and 99 energizes the closing coil 97 of the time delay control device 50, closing the relay contact blades 85 and 86. Closing of the contact blade 85 completes the circuit through the time delay switch device and the conductors 75 and 75a to the transformer 59, so that after approximately 15 seconds (or whatever time the time delay switch 83 is set for) the solenoid coil 79 will be energized to rock the throttle wheel holding latch 51 out of engagement with the lug 53 on the throttle wheel. The contact blade 86 of the relay 81 closes the circuit to the closing coil 94 for the pump relay 95, starting the pumps 96 into operation.

The Diesel engine-driven generator 2 will continue to supply energy to the consuming source and the safety control lever 26 on the engine, which is conventional, will hold the throttle wheel 20 in "running" position only so long as the engine is functioning properly and normally.

Even though the preferred source is again energized, the transfer back to the preferred source will not be made automatically. Stopping of the engine causes the safety lever 26 to move to release position, whereupon the throttle wheel 20 is released and the counterweight 28 rotates the throttle wheel sufficiently to normally move the push rod 8 upwardly, closing the breaker trip coil circuit at 73, 74, to energize the trip coil 72 for the auxiliary electrical source breaker 30 releasing the breaker member 64 so that the electrical power load of the auxiliary source will be removed from the generator upon stoppage of the Diesel, and the throttle wheel will gravitate to "stop" position. This latter operation is a conventional operation of the auxiliary source breaker 30. Manual starting of the engine, which is also conventional, requires the throttle wheel 20 to be turned to "starting" position, camming the push rod 8 upwardly to open the air valve 7 to admit starting air to the engine cylinders, and simultaneously the auxiliary electrical source circuit breaker trip coil 72 is energized, as a safety feature to prevent starting of the Diesel with load of the consuming source still on the generator.

Referring now to Figs. 4 to 7, disclosing a modified installation of my invention as applied to a different type of Diesel engine auxiliary electrical generating unit, such as a Fairbanks, Morse, model 32E12, stationary Diesel engine and generator unit, the reference numeral 101 indicates a portion of a Diesel engine having a conventional starting air control valve 102 thereon for supplying starting air under pressure from a supply pipe 103 to the engine cylinders in the usual manner to crank the engine. The conventional "starting" air control valve 102 has a "starting" position 104, and a "running" position 105 and a manually operable handle is conventionally employed to move the air control valve 102 to the "starting" position 104 to open the air valve to admit starting air to the engine cylinders to crank the engine; then, when the engine is turning over sufficiently fast to run under its own power, the handle is moved to the "running" position, shifting the air control valve to its "running" position 105, lifts the individual cylinder air control valve actuators (not shown) driven by the engine operated cam shaft, from the operating cam shaft (not shown) to prevent actuation of the individual air valves and prevent the admission of starting air to the engine while the engine is running under power.

In carrying out my invention, I substitute a crank 106 for this manually operable lever and other improved starting control mechanism, later described, for initially holding the starting air valve control device in its "starting" position 104, and subsequently effect the automatic moving of the valve device to its "running" position 105 after the engine has been started. The type of Diesel engine disclosed in Fig. 4 employs a throttle control device or automatic shutdown control valve 107 having a "priming" position 108, a "running" position 109 and a "stop" position 110. This valve 107 employs a return spring (not shown) for returning the same to its "stop" position 110 when released, as the weight on the throttle control wheel of the preferred form does when the wheel is released. A manually operable control lever 111 is provided having a depressible latch release rod 111a therein for holding the lever in "running" position. When the latching rod 111a is depressed, the lever 111 is released and the return spring just described will swing the lever 111, and its fuel or throttle control valve 107, to the "stop" position 110 shutting down the operation of the Diesel. Conventional solenoid operative means 152 are provided on the lever 111 and connected to the rod 111a for depressing the latching rod to release the lever and permit the spring to return the throttle control lever and valve to "stop" position. These specific elements are conventional and form no part of this invention, and are therefore not described further in detail.

A solenoid closed main starting air control valve 112 is provided, similar to the solenoid closed starting air by-pass valve 10 in Fig. 1, this valve 112 being interposed in the starting air line 103 between the usual air pressure reservoir (not shown) and the starting air control valve device 102. This valve 112 is spring tensioned to open, and a closing and holding solenoid coil 113 is provided which operates a lever 113a connected to the valve stem for actuating the valve closure member of the valve 112.

The solenoid 113 is energized by the preferred electrical source, as in the other embodiment of the invention, so that when the preferred electrical source fails, the solenoid will be de-energized, permitting the valve to tend to open to admit starting air to the engine cylinders 101 under the control of the air valve control device 106 previously referred to. Latch means are provided, however, in the form of a latching lever 115, pivotally carried on a yoke 116. The latching lever 115 is provided with a latching abutment 117 intermediate its pivot and upper end which is normally disposed in holding engagement with a shoulder 118 that is formed on the inner end of the valve actuating lever 113a, just beyond its pivotal connection to the yoke 116. The latching lever 115 extends downwardly as shown and carries adjacent its lower end a laterally extending push rod 119, the head of which is disposed in the path of movement of a time delay latch release device 120 arranged to be set by a solenoid 121, normally energized from the preferred source when the preferred source is energized. The latch release device 120 contains a clockwork drive mechanism, set and held against operation by a solenoid 121 so as to be released by the solenoid when the preferred source fails, so that after a predetermined time period after release, the clockwork actuates an abutment member 120a, moving the same to engage the push rod 119 on the latch lever 115, forcing the latch to rotate clockwise to release the starting air valve lever 113, permitting the opening spring 113b (similar to the spring 11 in Fig. 1), to open the air valve 112 to admit starting air to the engine, assuming that the preferred source is not again energized to energize the solenoid 113, to hold the main starting air valve 112 closed.

I provide an actuating air cylinder 122 Fig. 4, for moving the starting air control valve device 102 to "start" position when air is admitted into the cylinder. This cylinder is rigidly carried by the engine framework on a bracket as shown and has a piston 123 therein connected to the operating crank 106 of the starting air valve device 102, this connection comprising a piston rod 124 having a stop shoulder 126 at one end thereof, and a connecting link 125 between the piston rod 124 and the crank 106. A compression coil spring 127 is interposed between the lower end of the air cylinder 122 and the piston 123 for causing the upward movement of the piston rod 124 and link connection 125 to move the starting air control valve device 102 from its "starting" position 104 to its "running" position 105 when air pressure in the cylinder is eliminated. An air line 128 connects the top of the air cylinder 122 with the starting air conduit 103, between the main starting air valve 112 and the starting air valve control device 102.

When starting air is admitted through the pipe 103a to the engine cylinders past the main air valve 112, air will also be admitted under pressure into the air line 128, forcing the control valve device 102 toward its "start" position 104. A retractable chock member 129, however, is interposed between the shoulder 126 and the lower end of the air cylinder 122, in order to temporarily hold the starting air valve 102 in its "running" position while the engine is at rest, so that at the time the starting air is admitted through the delivery pipe 103a to the engine cylinders, the air control valve will be in "starting" position instead of "running" position. As the air entering the air line 128 moves the piston 127 downwardly, the valve device is moved a little, releasing the choke 129, and freeing the spring 127 which will now function when the starting air in 28 is cut off after the engine is running, to raise the piston 123 to the top of the cylinder, returning the starting valve 102 to its "running" position 105, disengaging the starting air admission valves from the cam shaft of the engine.

Referring to Figs. 5, 6, and 7, provision is made in this form of the invention for disconnecting the preferred source 153 upon failure or de-energization thereof, after the predetermined time delay period has elapsed, as controlled by the solenoid held and set time delay release mechanism 120, and for subsequently automatically connecting the auxiliary electrical source to the consuming source.

The two circuit breakers 130 and 131, as best seen in Figs. 6 and 7, for respectively connecting the preferred source with the consuming circuits or disconnecting the same, and connecting the auxiliary source with the electrical consuming source and disconnecting the same are conventional and it is not necessary to describe the detail construction thereof in detail, except to indicate that the preferred source breaker 130 is provided with a breaker trip lever 132 which is elevated to release the preferred source breaker and allow it to "kick out" in the usual manner.

I provide a vertical standard or support 133 in front of the two breakers 130 and 131 carrying an operating shaft 134 with an operating crank 135 fixed thereon for rotating the shaft. A crank disc 136 is fixed to the shaft 134 in front of the energy or auxiliary breaker 131 having a connected operating link 137 pivotally secured at 138 to a bracket secured to the emergency disconnect breaker lever 131. A camming disc 139 is fixed to the shaft 134 in front of the preferred source breaker 130, for rocking a centrally pivoted trip lever 140 to trip the preferred source breaker trip lever 132. When the shaft 134 is rotated in the direction of the arrow 141, the lever 140 is rocked counterclockwise by the cam notch 142 in the disc 139, causing the free end of the lever to engage the overhanging shoulder 143 and raise the preferred source trip lever 132 to release the preferred source breaker and disconnect the preferred source from the consuming source. Continued rotation of the shaft 134 in the direction of the arrow 141 moves the auxiliary source breaker 132 into closed position, connecting the auxiliary electrical source with the consuming source.

Means are provided for closing the auxiliary source breaker upon failure of the preferred electrical source, and for energizing of the auxiliary source, which are similar to those disclosed in the first form of the invention. These comprise a breaker actuating air cylinder 145 having an air hose 146 connected between the top of the breaker actuating air cylinder 145 and the starting air supply conduit 103a, with a solenoid opened starting air valve 147 interposed in the air hose line 146 between the air control valve 102 at the engine and the starting air valve 112.

The electrically opened air control valve 147 in the air line 146 is energized by the auxiliary electrical power source when the auxiliary engine generator is being driven sufficiently to produce a predetermined electrical output therefrom.

The preferred and auxiliary source breakers 130 and 131, and shaft 134, are set in the position shown in Fig. 7 of the drawings when the preferred source is energized and connected to the consuming source, the preferred source breaker being closed while the auxiliary source breaker is open. The operating crank 135 is disclosed as inclining upwardly to the right from the shaft, with the piston in the upper end of the breaker actuating air cylinder 145. When starting air enters the conduit 103a for starting the engine, due to the opening of the valve 112, air is also present under pressure in the air line 146 between the breaker controlling air valve 147 and the pipe 103a, and air is also under pressure in the conduit 128, forcing the air starting valve actuating piston 123 in the cylinder 122 downwardly in its "running" position to release the chock 129. When the electrically operated breaker actuating air valve 147 opens, the piston in the cylinder 145 is forced downwardly tripping the main or preferred source breaker 130 and subsequently closing the auxiliary source breaker 131 as the piston moves downwardly.

Before referring to the wiring diagram, as shown in Fig. 5, it should be noted that I provide a safety release means for stopping the engine in the event of overheating of the circulating water similar to that in the preferred form. A thermal bulb 150 is disposed in the engine water circulating system 151 having a pressure conduit 152 leading to a pressure operated plunger 153 mounted on the engine just above the "automatic shutdown" lever 111 when the same is latched in "running" position, with the plunger disposed in position to depress the central release rod to release the shutdown lever 111 when an expansion of the heated liquid medium in the bulb 150 occurs, due to predetermined rise in temperature of the engine cooling medium. When the plunger 150 is depressed, the "automatic shutdown" lever 111 is released and the spring (not shown) moves the "shutdown" lever to "stop" position, stopping the engine in the conventional manner. The "shutdown" lever and release rod or plunger of the "automatic shutdown" lever 111 also conventionally carry an actuating solenoid and core 152 which when energized by safety control circuits, depresses the rod to release the lever and stop the engine when the lever returns to "stop" position. This release means is a conventional safety control feature for stopping the engine due to other improper functioning of the engine such as when the water or oil pressure fails, and suitable pressure control switches are closed to energize the coil release device 152 to stop the engine.

Referring now to the wiring diagram, Fig. 5, the preferred circuit is indicated at 153, having a conventional stepdown transfer 154 therein and leading to the transfer breakers 130 and 131 previously referred to. The Diesel engine-driven auxiliary circuit energizing generator is indicated at 155, having the conductors 156 leading to the transfer unit 130, 131 having a circuit breaker 157 intermediate the same which functions when tripped to interrupt current between the generator 155 and the transfer breaker 130 and 131. The consuming electrical source is indicated at 158, being connected to the transfer breakers by the conductors 159, while the station power panel or supplemental consuming source is indicated at 160, having the main starting air valve solenoid 113, and the time delay latch operating solenoid 121 connected to the output of the station power panel 160 by the conductors 161. When this panel is energized, either by the preferred source, or by the consuming source, these two solenoids are energized so as to close the main starting air valve 112 and set the clockwork 120 for subsequently disengaging the time delay release control latch member 115, for the main starting air control valve 112, from its engagement with the notch 118 in the release lever 113. Two of the phases 156 from the generator 155 are connected to a transformer 162 having output lines 163, 163a and 163b leading to the time delay relays 164 and 165. The conductor 163 is common to both of the relays 164 and 165.

In the operation of the invention, failure of the preferred source 153 de-energizes the supplemental consuming source of power panel 160, de-energizing both the main starting air valve solenoid 113 and the clockwork actuated time delay release latch setting and holding solenoid 121. After the predetermined definite time period for which the time delay is set, the clockwork actuated abutment arm 120a engages the projection 119 rocking the latch 115 to release the starting air valve lever 113a, permitting the starting air valve 122 to open, since its holding solenoid is also de-energized by the failure of the preferred electrical source. This valve opens to admit starting air to the engine, "cranking" the same up to starting speed. If the preferred source is again energized before the time delay period ends, time delay mechanism 121 will not release the starting air valve lever 113a to admit starting air to the engine, and the preferred source 153 will remain connected with the consuming source 158 and 159.

The time delay release mechanism 120 is preferably set to permit the preferred source to be cut off from the consuming source for very short periods of time, such as 15 or 20 seconds, before the auxiliary electrical supply system is started up, and the subsequent transfer over to the auxiliary electrical generating source 156 is made, permitting the testing or switching of the preferred source or equipment within the time delay period without energizing the auxiliary electrical source.

When the generator 155 is generating electricity, the electrical output from the transformer 162, over the conductors 163, 163a and 163b first energizes the time delay relay 164, which relay, after a fifteen-second interval, closes the circuit through conductors 164b to the second time delay relay 165. At the end of the time delay interval, as controlled by the relay 164, the conductor 166 is energized to open the air control valve 147, shifting the two breakers 130 and 131 to disconnect the preferred source 153 from the consuming source 158 and connect the auxiliary source 156 to the consuming source 159.

The contacts of the second time delay relay 165 breaks the circuit to the electrically operated air valve 147 relieving pressure on the air hose 146 and close the circuit through the conductors 165a and 163a to the "automatic shutdown" control switches 168 which by this time have been opened by oil and water pressure from the engine pumps due to the proper functioning of the engine.

Energizing the conductors 163a and 163b, when the generator starts, closes the relay 170, starting the water pumps, evaporator control motors, etc., for the engine. When electric energy is being generated by the generator 155, the circuit 171 connected to the conductors 163 and 163a supplies current to visible and audible signal means such as an electric horn and signal lights 173.

Having thus described my invention what I claim as new and desire to secure by Letters Patent of the United States is:

1. In an electrical system, a main electrical energy consuming circuit, a secondary electrical energy consuming circuit, a preferred electrical energy supply circuit, an auxiliary electrical energy supply circuit, a Diesel engine, generator means driven by the engine for energizing said auxiliary supply circuit, circuit breaker means between said preferred supply circuit and said main and secondary consuming circuits for energizing the same from the preferred supply circuit, operable upon failure of the preferred supply circuit to disconnect the preferred supply circuit from the main and secondary consuming circuits, air starting means for starting the Diesel engine upon failure of the preferred supply circuit including a starting air supply line for supplying air under pressure to the Diesel engine to start the same, starting air control valve means in said air supply line, electrically operable holding means for holding said starting air valve closed including an energizing circuit connected to said secondary electrical energy consuming circuit to be energized thereby when said secondary consuming circuit is energized, means for opening said starting air valve to admit starting air to the Diesel engine to start the same when said secondary consuming circuit and said electrically operable holding means are de-energized, auxiliary circuit breaker means between the main and secondary electrical consuming circuits for connecting the auxiliary supply circuit to the main and secondary consuming circuits, air operated breaker closing means for closing said auxiliary circuit breaker, including an air supply conduit connected to said air operated breaker closing means and normally closed air control valve means in said air supply conduit, electrically operable valve actuating means for opening said last-mentioned air control valve means to admit air through said conduit to said air operated breaker closing means when the valve actuating means is energized, and an energizing electric circuit connecting said valve actuating means to said auxiliary supply circuit, to be energized by the auxiliary supply circuit when the Diesel engine is started and the auxiliary supply circuit is energized to open said air control valve means to admit air to said air operated breaker closing means to close the auxiliary breaker means to connect the main consuming circuit to the auxiliary supply circuit.

2. In an electrical system, a Diesel engine, starting means therefor having a starting air pressure supply conduit connected to the Diesel including a normally open starting air supply valve in said conduit for admitting starting air to the Diesel to start the same, electro-magnetic valve holding means for holding said starting air supply valve in closed position when energized, an auxiliary electrical supply circuit energized by operation of said Diesel engine, a preferred electrical supply circuit, a main electrical consuming circuit, a secondary electrical consuming circuit, electrically operable circuit transfer means between the preferred and auxiliary supply circuits for selectively connecting the secondary consuming circuit to the preferred supply circuit when the preferred supply circuit is energized and disconnecting the preferred supply circuit from the secondary consuming circuit and connecting the secondary consuming circuit to the auxiliary supply circuit when the preferred supply circuit fails and the auxiliary supply circuit is energized, means for energizing said electromagnetic valve holding means from said secondary consuming circuit when the secondary consuming circuit is energized to maintain said starting air valve closed when the secondary consuming source is energized, either by the preferred electrical source or by the auxiliary electrical circuit, a main circuit breaker in the preferred electrical supply circuit connecting the same to the consuming circuits and operable upon the failure of the preferred circuit to disconnect the same from the consuming circuits, an auxiliary electrical supply circuit controlling breaker connected between the auxiliary electrical circuit and the main consuming circuit for connecting the main consuming circuit to the auxiliary electrical supply circuit, and electrically energized closing means for closing said auxiliary source breaker, including an energizing circuit connected to the auxiliary electrical supply circuit to be energized thereby, to connect the auxiliary supply circuit to the main electrical consuming circuit.

3. In an electrical supply system of the class described, a main electrical consuming circuit, a preferred electrical supply circuit, a main breaker between said supply and consuming circuits to connect the preferred circuit to the consuming circuit and operable upon failure of the preferred circuit to disconnect the same from the consuming circuit, an auxiliary electrical supply circuit adapted to be connected to said consuming circuit having an auxiliary circuit breaker therein between the auxiliary supply circuit and the consuming circuit for closing and interrupting the auxiliary circuit connection to the consuming circuit, electrically operable means for closing said auxiliary circuit breaker having an energizing circuit connected to said auxiliary electrical supply circuit, a dynamo for energizing said auxiliary circuit, a Diesel engine for driving said dynamo, a starting air supply conduit for delivering starting air under pressure to the Diesel engine to start the same, starting air control valve means in said conduit, means for normally opening said valve, solenoid operated closing means connected to said starting air control valve means to maintain the same closed when energized, and an energizing circuit connected between said solenoid operated closing means and the consuming circuit to be energized by the consuming circuit for maintaining the starting air valve closed when the consuming circuit is energized.

4. In an electrical system, a main electrical consuming circuit, a secondary electrical consuming circuit, a preferred electrical supply circuit, an auxiliary electrical supply circuit, a Diesel engine-driven dynamo for energizing said auxiliary electrical supply circuit, breaker means, between said preferred and consuming circuits connecting the same and operable upon the de-energizing of the preferred circuit to break said connection, a transfer breaker electrically connected between the preferred supply circuit, the secondary consuming circuit and the auxiliary supply circuit having means operable by energy received from said preferred supply circuit to connect said preferred supply circuit to said secondary consuming circuit, and operable when the preferred circuit fails and the auxiliary supply circuit is energized by energy received from said auxiliary supply circuit to connect the auxiliary supply circuit to the secondary consuming circuit, a starting air supply conduit for said Diesel engine for supplying starting air to the Diesel for the starting thereof, starting air valve means in said conduit, spring means normally opening said starting air valve means, electrically operable closing means for said starting air valve means connected to said supplemental consuming circuit to be energized by the supplemental consuming circuit, air operated auxiliary breaker closing means for moving said auxiliary circuit breaker to closed position to connect the auxiliary circuit to the main consuming circuit, including normally closed air valve means controlling the admission of air under pressure to said air operated breaker closing means to close said auxiliary breaker, electrically operable valve actuating means connected to said last-mentioned normally closed air valve means for opening the same, having an energizing circuit connected to said auxiliary supply circuit to be energized thereby to open the valve means when the auxiliary circuit is energized, and circuit breaking means in said valve actuating means energizing circuit operable by the air operated breaker closing means when the air operated breaker closing means moves the auxiliary breaker closed to de-energize the air valve actuating means energizing circuit.

5. In an electrical system, a main electrical consuming circuit, a preferred electrical supply circuit connected to said consuming circuit, an auxiliary electrical circuit including a generator therefor, a Diesel engine for operating said generator to energize the auxiliary supply circuit, breaker means in said preferred circuit between the same and the consuming circuit operable by failure of the preferred circuit to disconnect the preferred circuit from the consuming circuit, auxiliary supply circuit breaker means connected between the auxiliary supply circuit and the main consuming circuit and operable to connect the auxiliary supply circuit to the main consuming circuit, means for closing said auxiliary supply circuit breaker to connect the auxiliary supply circuit to the main consuming circuit comprising air operated actuator means, electrically operable means to initiate the operation of the air operated actuator means having an energizing circuit connected to the auxiliary electrical supply circuit to be energized thereby when the auxiliary supply circuit is energized, circuit breaker means in said last-mentioned energizing circuit, movable by said auxiliary circuit breaker operating means to circuit breaking position when the operating means moves the auxiliary breaker to closed position, to de-energize the auxiliary circuit breaker operating means, starting air supply means for said Diesel including an air conduit connecting the cylinders of the engine to admit starting air thereto, a normally open solenoid closed air admission valve in said air conduit, an energizing circuit for maintaining said air admission valve in closed position when the circuit is energized, electrical circuit transfer means between said air valve energizing circuit, said preferred electrical supply circuit, and said auxiliary supply circuit including means for connecting said air admission valve solenoid energizing circuit to said preferred circuit when the preferred circuit is energized, and connecting the air admission valve solenoid energizing circuit to the auxiliary supply circuit when the preferred circuit is de-energized and the auxiliary circuit is energized, a throttle control device for said Diesel engine having a "starting" position for admitting starting air to the Diesel to start the same, independently of said first-mentioned starting air valve, and having a "stop" position for stopping the Diesel, primary pressure operated safety latch means on the Diesel arranged for cooperative engagement with the throttle device for latching the throttle device in "running" position, means for moving the throttle device when released to "stop" position, automatically, when said safety latch means is released, secondary time delay operated latch means engageable with the throttle device to hold the throttle device in "running" position when the Diesel is not operating, electrically operable release means engageable with said secondary latch means for moving said secondary latch means to release position including an energizing circuit electrically connected to said auxiliary supply circuit to be energized thereby, having time delay control means in said circuit to delay the closing of said circuit to said secondary latch release operating means for a predetermined time delay period to delay the movement of the secondary latch means to release position.

6. In an electrical system, a consuming electrical circuit, a preferred electrical supply circuit connected to said consuming circuit, a circuit breaker means connected between the preferred and consuming circuits operable upon failure of the preferred supply circuit to disconnect the same from the consuming circuit, a Diesel engine, generator means driven thereby, an electrical supply circuit connected to said generator to be energized by said generator means, auxiliary circuit breaker means between said auxiliary supply circuit and the consuming circuit operable to connect the auxiliary supply circuit to the consuming circuit, air operated means for starting the Diesel and for moving the auxiliary circuit breaker means to closed position to connect the auxiliary supply circuit to the consuming circuit to energize the consuming circuit, movable throttle control means on the Diesel having a "stop" position for stopping the Diesel and generator, and a "running" position for maintaining the Diesel in operation after it has been started, means for automatically moving the throttle control means to "stop" position when released, latch means between the engine and throttle control means operable to engage and hold the throttle means in "running" position during normal operation only of the engine and releasable when the engine is not operating normally, and secondary time delay actuated latch means between the engine and throttle control means for holding the throttle control means in "running" position when the engine is not in operation, including electrically operable time delay means for moving the secondary time delay latch means to release position to free the throttle control device therefrom including an energizing circuit connected to the auxiliary electrical supply circuit to be energized thereby when the Diesel is initiated into operation.

7. In combination with an electrical system of the class described including an electrical consuming source, a preferred electrical supply source connected thereto having circuit breaker means therein for disconnecting the preferred source from the consuming source upon failure of the preferred source, an auxiliary electrical supply source including a Diesel engine and an electrical generator driven thereby for energizing the auxiliary electrical source, an auxiliary source circuit breaker between the auxiliary source and the consuming source, said Diesel engine having rotatable throttle means thereon for starting and stopping the Diesel, said throttle means having a "starting" position for admitting starting air to the Diesel to crank the same, a "running" position for interrupting the admission of starting air and for controlling the supply of operating fuel to the Diesel engine and a "stop" position to discontinue the operation of the Diesel, means for normally moving the throttle means when released to said "stop" position, primary releaseable latch means for holding the throttle device in "running" position only while the Diesel engine is operating normally including fluid pressure generating means operable by the Diesel and a fluid pressure operated latch engaging device operable by fluid pressure from the fluid pressure generating means to hold the primary latching means in latching engagement with the throttle means while the same is in "running" position, means for disengaging the primary latching means from the throttle means to release the throttle control device upon a predetermined reduction in the pressure from the fluid pressure generating means; of a second starting air admission valve and means for by-passing starting air to the engine around said first-mentioned starting air valve under control of said second starting air admission valve to initiate the starting of the engine with the throttle means in "running" position, means to normally open said second starting air admission valve to by-pass starting air to the engine for cranking the same, solenoid means for closing said second starting air admission valve including an energizing circuit for the solenoid means for closing and holding said second starting air admission valve closed when the solenoid circuit is energized, an electrical circuit transfer device between the preferred and auxiliary source and said last-mentioned energizing circuit connecting said starting air admission valve energizing circuit to said preferred electrical source when the preferred electrical source is energized or to said auxiliary source when the auxiliary source is energized, electrically actuated means for actuating said circuit transfer device to disconnect the same from the preferred electrical source and connect the same to the auxiliary electrical source when the preferred electrical source is interrupted and the auxiliary electrical source is energized.

8. Apparatus as claimed in claim 7 including air operated closing means for closing the auxiliary source breaker between the auxiliary electrical source and the consuming source including an electrically opened air valve therefor connected to said auxiliary electrical source to be energized thereby to open said air valve when the auxiliary source is energized to admit air to the closing means to close the auxiliary source breaker.

9. Apparatus as claimed in claim 7 including electrically operable time delay release latch means to hold said throttle means in "running" position when the Diesel is not in operation, including a second release latch device normally engaging said throttle control device to hold the same in "running" position, and an energizing circuit therefor to release said second release latch connected to said auxiliary supply circuit having a time delay operated circuit closer therein to be energized thereby to release the throttle control device after the Diesel has operated beyond the time delay control period of said time delay release means.

10. In an electrical system, a main electrical consuming circuit, a preferred electrical supply circuit connected thereto, breaker means between said circuits for disconnecting the main consuming circuit from the preferred circuit when the preferred circuit fails, an auxiliary electrical supply circuit, breaker means between the auxiliary supply circuit and the consuming circuit for connecting the auxiliary supply circuit to the consuming circuit when the auxiliary supply circuit is energized, a Diesel engine, a dynamo driven thereby for energizing said auxiliary supply circuit, said Diesel engine having a throttle wheel rotatable to "starting," "running," and "stop" positions for respectively controlling the "starting," "running," and "stopping" operations of the Diesel, safety shutdown latch means engageable with said throttle wheel to hold said throttle wheel in "running" position during only normal operation of the Diesel, means operable by the Diesel to release said throttle wheel holding latch means during abnormal operation of the Diesel, means for rotating the throttle wheel to "stop" position when released by said latch means to stop the Diesel, supplemental latch means for holding said throttle wheel in "running" position when the Diesel is at rest and during a predetermined initial starting period thereof including electromagnetic time delay operated means for moving the supplemental latch means to release position to release the throttle wheel after a predetermined time delay period, an energizing circuit for said time delay operated latch release means connected to said auxiliary electrical supply circuit to be energized thereby, air starting means for the Diesel having a starting air conduit for introducing starting air into the Diesel to start the same, a starting air supply valve in said conduit, means to open the starting air supply valve, and solenoid means for closing said starting air supply valve including an energizing circuit connecting said solenoid and to the preferred electrical source when energized, and to the auxiliary electrical supply when the auxiliary electrical supply is energized and the preferred electrical supply is de-energized.

11. In an electrical system, a consuming electrical circuit, a preferred electrical source, and an auxiliary electrical source, breaker means between the preferred source and the consuming source, and between the consuming source and the auxiliary electrical source for disconnecting the preferred source from the consuming source and connecting the auxiliary electrical source to the consuming source comprising a breaker for disconnecting the preferred source from the consuming source and a second breaker for connecting the auxiliary source to the consuming source, a Diesel engine, a dynamo driven thereby for energizing the auxiliary source when the Diesel is operated, control means for the Diesel engine comprising throttle means on the engine having a "running" position for controlling the continued operation of the Diesel, a starting position for admitting starting air to the Diesel to start the same and a "stop" position for discontinuing the operation of the Diesel, engine operated means for holding said throttle control means in "running" position only when said Diesel is operating, means for moving said throttle control means to stop position when released by said engine operated holding means, and supplemental releasable holding means engageable with said throttle means when in "running" position, while the Diesel is at rest, electromagnetic means for moving said supplemental holding means to release position to free said throttle means, including an energizing circuit connected to said auxiliary electrical source to be energized thereby when the auxiliary electrical source is energized, and time delay control means in said last-mentioned energizing circuit for delaying the energizing of said electromagnetic moving means for a predetermined time period and then energizing the same to permit the engine operated holding means to function during the starting of the engine and hold the throttle means in "running" position before said supplemental holding means is moved to release position.

12. In an electrical system, a consuming circuit, a preferred circuit connected thereto, breaker means for disconnecting the consuming circuit from the preferred circuit when the preferred circuit is de-energized, an auxiliary supply circuit, breaker means for connecting the auxiliary supply circuit to the consuming circuit to re-energize the consuming circuit, an internal combustion engine, an electrical generator driven thereby and connected to the auxiliary circuit to energize the same, throttle means for the engine having a "running" position, a "starting" position and a "stop" position for respectively controlling the running, starting and stopping of the engine, means for moving said throttle means when released to "stop" position, engine operated safety latch means for holding said throttle means in running position when said engine is running normally, supplemental latch means for holding said throttle means in running position while said engine is not in operation, electrically operable release means for moving said supplemental latch means to release position having an energizing circuit connected to said auxiliary supply circuit to be energized thereby, time delay operated means in said last-mentioned energizing circuit operable by the energizing of the circuit to delay the energizing of said electrically operable release means, air starting means for cranking said engine to start the same, electrically operable holding means engageable with said air starting means to prevent the operation of said air starting means when said holding means is energized, an energizing circuit for said electrically operable holding means connected to said preferred circuit to be de-energized incident to the de-energizing of the preferred circuit to de-energize said holding means to permit said air starting means to start the engine.

13. In an electrical system including a consuming electrical source, a preferred electrical source connected thereto, and an internal combustion engine having air starting means therefor, a dynamo driven by said engine constituting an auxiliary electrical supply source, preferred source circuit breaker means between the preferred and consuming sources for disconnecting the preferred source from the consuming source when the preferred source fails, auxiliary source breaker means between the auxiliary source and the consuming source including a breaker closing circuit connected to the auxiliary source to be energized thereby to close the auxiliary source breaker and establish electrical connection between the auxiliary source and the consuming source, a starting air valve for admitting starting air to the air starting means of the engine, spring means for opening said air valve, electromagnetic closing means for closing the air valve and maintaining the same in closed position when energized including an energizing circuit therefor and circuit transfer means for said energizing circuit connected to said preferred electrical source, said auxiliary electrical source, to be energized by the preferred source to connect the preferred source to said air valve energizing circuit to close the air valve and hold the same closed when the preferred source is energized, and to be energized by said auxiliary electrical source to disconnect the preferred source from the consuming source and connect the consuming source to the auxiliary source when the preferred source is de-energized and the auxiliary source is energized to effect closing of the air valve, releasable latch means normally engageable with said air valve to normally hold said air valve in closed position, time delay release means constructed and arranged to engage said latch means and move the same to release position to free the starting air valve after a predetermined time period, and electro-magnetic holding means connected to said time delay release means for setting and holding the same in inoperative position having an energizing circuit therefor connected to said preferred electrical source.

14. In an electrical system, a preferred electrical source and a consuming electrical circuit, an internal combustion engine dynamo electrical generating unit constituting an auxiliary electrical source, air operated starting means for cranking the engine having a starting air supply conduit connected to an air pressure supply, air control valve means in said air conduit controlling the admission of starting air to said air starting means, means normally opening the air valve to admit starting air to the engine to crank the same, electro-magnetic means connected to the starting air valve to close the air valve and hold the air valve in closed position when energized including an energizing circuit for the electro-magnetic means connected to the preferred electrical source, latch means engageable with said starting air valve to hold the same in closed position, time delay release means constructed and arranged to engage the latch means and move the latch means to release position after a predetermined time delay period, electro-magnetic setting and holding means connected to said time delay release means including an energizing circuit therefor connected to the preferred source for setting the time delay latch release means and holding the same in set position only when the last-mentioned energizing circuit is energized, breaker means between the preferred electrical source and consuming source for energizing the consuming source from the preferred source, operable upon failure of the preferred source to disconnect the same from the consuming source, and breaker means between the auxiliary electrical source and the consuming source operable upon failure of the preferred source and the energizing of the auxiliary source to connect the auxiliary source to the consuming source.

15. In an electrical system, a preferred electrical source and a consuming electrical circuit, an internal combustion engine dynamo electrical generating unit constituting an auxiliary electrical source, air operated starting means for cranking the engine having a starting air supply conduit connected to an air pressure supply, air control valve means in said air conduit controlling the admission of starting air to said air starting means, means normally opening the air valve to admit starting air to the engine to crank the same, electro-magnetic means connected to the starting air valve to close the air valve and hold the air valve in closed position when energized including an energizing circuit for the electro-magnetic means connected to the preferred electrical source, latch means engageable with said starting air valve to hold the same in closed position, time delay release means constructed and arranged to engage the latch means and move the latch means to release position after a predetermined time delay period, electro-magnetic setting and holding means connected to said time delay release means including an energizing circuit therefor connected to the preferred source for setting the time delay latch release means and holding the same in set position only when the last-mentioned energizing circuit is energized, breaker means between the preferred electrical source and consuming source for energizing the consuming source from the preferred source, operable upon failure of the preferred source to disconnect the same from the consuming source, breaker means between the auxiliary electrical source and the consuming source operable upon failure of the preferred source and the energizing of the auxiliary source to connect the auxiliary source to the consuming source, and transfer breaker means between the preferred source, the auxiliary source and the consuming source operable upon failure of the preferred source and the energizing of the auxiliary source to disconnect the starting air valve time delay release latch electro-magnetic holding means from the preferred electrical source and connect the same to the auxiliary electrical source to re-energize the electro-magnetic holding means for the starting air valve and the time delay release latch means from the auxiliary electrical source.

16. In an electrical generating system, a Diesel engine having a fluid pressure circulating system, and movable throttle control means for controlling the operation of the engine, a dynamo driven by said engine constituting an auxiliary electrical supply, an auxiliary supply circuit energized thereby, a consuming electrical circuit, breaker means between the preferred and consuming circuits and between the auxiliary and consuming circuits for disconnecting the preferred circuit from the consuming circuit and connecting the auxiliary circuit to the consuming circuit, said engine throttle control means being movable to "starting," "running," and "stop" positions for respectively controlling the starting, running and stopping of the Diesel when the throttle control means is in said respective positions, latch means engageable with said throttle control means to hold the same in running position, means for normally moving said latch means to release position, fluid pressure operated holding means connected to the fluid pressure circulation system of the engine, operable to maintain the said latch means in holding relation with said throttle control means by a predetermined pressure in the circulation system, means for moving said throttle control means to "stop" position when freed by said latch means to stop the engine, supplemental latch means releasably engaging said throttle means to hold the throttle control means in "running" position independently of said engine operated latch means, electrically operated time delay latch release means for disengaging said supplemental latch release means after a predetermined time period, an energizing circuit connected to said auxiliary supply circuit to be energized thereby when the auxiliary supply circuit is energized to operate said time delay latch release means to disengage the same from the throttle control means after the time delay period.

17. Apparatus as claimed in claim 16 including a starting air supply conduit for supplying starting air to the Diesel engine to start the same, a normally open starting air control valve in said conduit, electro-magnetic valve closing means for closing said starting air control valve when energized including an energizing circuit connected to the preferred source to be deenergized when the preferred source is deenergized to release the starting air control valve to permit the same to open, releasable latch means normally engaging said starting air valve to prevent the opening thereof, settable time delay operated latch release means engageable with said air valve holding latch means to move the latch means to release position after a predetermined time period, electro-magnetic setting and holding means connected to said settable time delay operated latch release means, an energizing circuit connected to said electro-magnetic setting and holding means and to said preferred electrical circuit to be energized by the preferred circuit to set the time delay operated latch release means when the preferred circuit is energized and to hold the time delay latch release means in nonoperative position while the preferred circuit is energized.

18. In an electrical system, a consuming electrical circuit, a preferred electrical circuit adapted to be connected to the consuming circuit to energize the same, an auxiliary electrical circuit adapted to be connected to the consuming circuit to energize the same, means for connecting the auxiliary circuit to the consuming circuit when the preferred circuit fails and the consuming circuit is energized, a Diesel engine, an electrical generator driven thereby and connected to the auxiliary circuit to energize the auxiliary circuit, air starting means normally operable to crank and start said Diesel engine, electro-magnetic means connected to the preferred circuit to be energized thereby and connected to said air starting means to hold the air starting means in nonoperative position when energized, holding means engageable with said air starting means to normally prevent the operation of said air starting means, settable time delay operated release means engageable with said holding means to release the same after a predetermined time period, and electro-magnetic means for setting said time delay operated release means and holding the same in set position including an energizing circuit therefor connected to said preferred electrical circuit to be energized thereby.

WERNER E. F. LAGING.

REFERENCES CITED

The following references are of record in the file of this patent:

UNITED STATES PATENTS

| Number | Name | Date |
|---|---|---|
| 1,028,364 | Knight et al. | June 4, 1912 |
| 1,662,366 | Cosgray | Mar. 13, 1928 |